United States Patent [19]
May et al.

[11] Patent Number: 5,061,133
[45] Date of Patent: Oct. 29, 1991

[54] BACKHOE LOCKING PIN

[75] Inventors: William G. May, Smithland, Ky.;
Albert H. Fischer, Fanwood, N.J.

[73] Assignee: F & M Products Mfg. Corp., Manville, N.J.

[21] Appl. No.: 598,014

[22] Filed: Oct. 11, 1990

[51] Int. Cl.[5] .............................................. F16B 21/00
[52] U.S. Cl. ...................................... 411/340; 411/351
[58] Field of Search ............. 411/340, 341, 344, 345, 411/351, 354; 403/108, 154, 155

[56] References Cited

U.S. PATENT DOCUMENTS

| | | | |
|---|---|---|---|
| 2,454,856 | 11/1948 | Bible | 411/351 |
| 4,443,144 | 4/1984 | Defrancq | 411/351 |
| 4,840,528 | 6/1989 | Doom | 411/340 |

FOREIGN PATENT DOCUMENTS

| | | | |
|---|---|---|---|
| 535508 | 10/1931 | Fed. Rep. of Germany | 411/351 |
| 2819624 | 11/1979 | Fed. Rep. of Germany | 411/340 |

Primary Examiner—Neill R. Wilson
Attorney, Agent, or Firm—Anthony J. Casella; Gerald E. Hespos

[57] ABSTRACT

A locking pin is provided for detachably connecting a bucket to a backhoe loader. The locking pin comprises a shaft member having an enlarged head portion and an axial bore extending partially therethrough. Spring loaded plunger means are disposed in the axial bore. A planar retaining member is pivotally mounted to the enlarged head portion of the shaft member. The retaining member includes an omega-shaped clasp portion which extends generaly perpendicular therefrom and which is operative with the spring loaded plunger means to lock the pin.

13 Claims, 2 Drawing Sheets

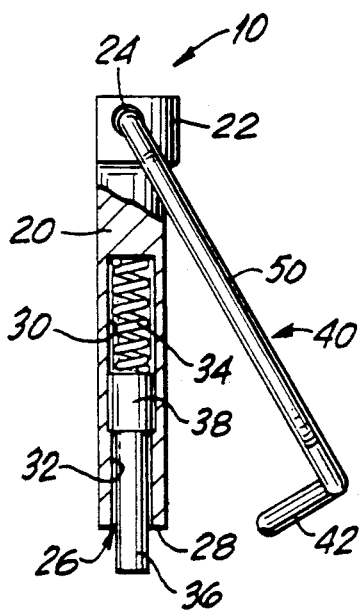 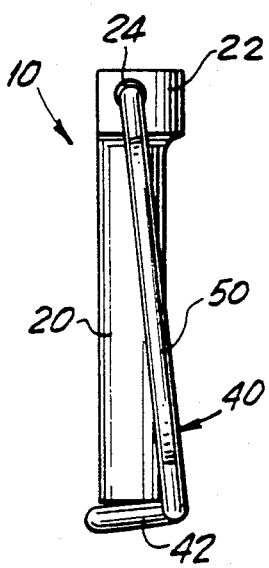 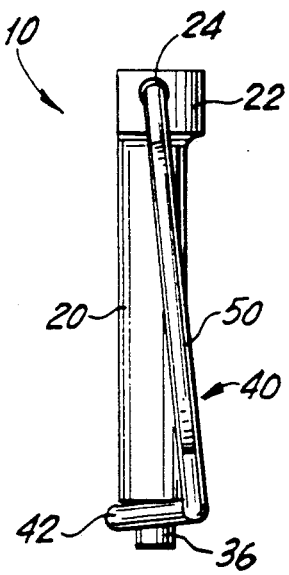
FIG.4A   FIG.4B   FIG.4C
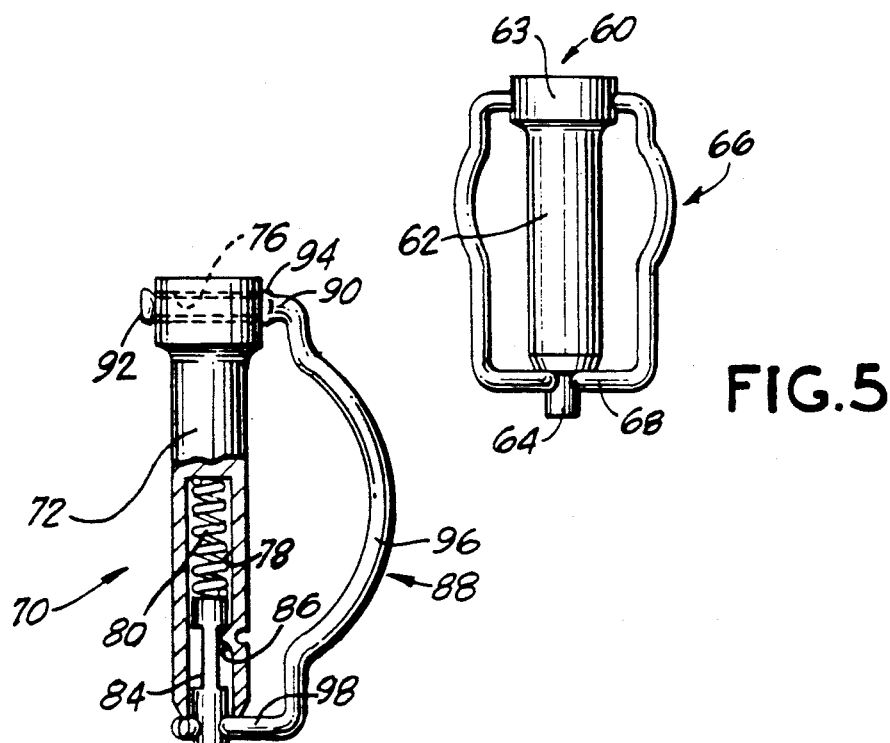
FIG.5
FIG.6

BACKHOE LOCKING PIN

BACKGROUND OF THE INVENTION

Tractors, in particular backhoe loaders are often employed in many aspects of construction and excavation including loading, lifting, craning, digging, dozing, spreading and grading. Seldom will it be found that a single bucket can be employed for all of these activities. Therefore, various bucket designs are used depending upon the operation being performed. Hence, it is necessary to provide adequate means for detachably connecting a bucket to a backhoe loader so that any bucket may be readily interchanged with another.

A bucket is commonly detachably interlocked to the dipper stick of a backhoe loader by equipment locking pins. Tractor equipment pins generally comprise a hardened metal pin having an enlarged head with a retaining ring pivotally mounted thereto. The retaining rings of most tractor equipment pins are easily swung into and out of a retaining position upon encountering debris or vibrations thereby leaving the pin free to be shaken from its mounted position.

Improvements for connecting excavating implements such as a bucket to a machine such as a tractor have been made in the prior art. U.S. Pat. No. 2,856,806 which issued to Gibbons on Oct. 21, 1958, entitled "COUPLING PIN WITH PIVOTABLE SECURING RING" discloses a coupling pin with a spring loaded retractable bolt retained within the pin and a pivoting pull ring. To lock the pin, the bolt is first retracted within the pin. Thereafter, the pivoting pull ring is swung downwardly to a position inboard of the retractable bolt. At such a time the bolt is released so as to return to its normal extended position whereupon the pull ring is held adjacent to the bolt shaft. The pull ring however, is left free to swing free behind the bolt, and therefore it is susceptible to becoming snagged or elongated in such a manner as to damage or accidentally dislodge the pin.

U.S. Pat. No. 4,840,528 which issued to Doom on June 20, 1989 entitled "LOCKING HITCH PIN ASSEMBLY" discloses a hitch pin assembly for locking equipment to a tractor. The hitch pin comprises a locking pin having a pivoting pull ring serving as the locking mechanism. A retractable spring loaded rod having a keeper notch is disposed in the pin. An access slot is provided in alignment with the notch to allow receipt of the pull ring. To lock the pin the pull ring is swung downwardly so as to enter the access slot. Thereafter, the spring loaded rod is retracted into the pin so as to allow the keeper notch to engage the pull ring. At such a time the retractable rod is released and allowed to return to its normally extended position whereupon the hitch pin is locked.

Another prior art locking pin is disclosed in a German patent application which was Laid-open for public inspection, Offenlegugsschrift 28 19 624, on May 5, 1978. The latter German patent application discloses a locking pin which includes a plug shaft having a plug head through which extends an aperture. A spring washer formed from a spring steel wire is pivotally mounted in the aperture in the plughead. The spring washer is formed with a resilient jaw shaped clamp. Upon locking the pin the spring washer is pivoted such that the resilient clamp makes contact with the lower end of the plug shaft and, thereupon the clamp deflects so as to seize the plug shaft. At such a time the prior art pin is locked. In order to open the pin, the spring washer must be pulled so as to cause the resilient clamp to deflect and disengage the plug shaft. Repeated opening and closing operations will eventually cause the spring steel wire to deform and eventually fail, whereby the pin will have to be discarded.

It is therefore an object of the subject invention to provide a locking pin for connecting a bucket to backhoe loader having a rigid retaining ring that will not deform.

It is a further object of the subject invention to provide a locking pin for connecting a bucket to a backhoe loader that is inexpensive to manufacture.

SUMMARY OF THE INVENTION

The subject invention is directed to a locking pin for connecting an excavating implement such as a bucket, to a backhoe loader. The subject locking pin is particularly suited for repeated use and is immune to disengagement by external forces.

The locking pin of the subject invention basically comprises a metal shaft body having an enlarged head. A rigid metal retaining ring is pivotally mounted in the head of the shaft and is particularly dimensioned to encircle a desired mounting shaft. The rigid retaining ring is formed with a generally omega-shaped clasp portion which extends generally orthogonal to the plane of the ring. The shaft body of the subject locking pin includes an axial bore which extends partially therethrough, and a coiled spring and a retractable plunger which are disposed in the axial bore and which cooperate with the clasp portion of the rigid retaining ring to detachably lock the pin.

To operate the locking pin of the subject invention an axial force must be applied to the retractable plunger so as to compress the coiled spring and fully withdraw the plunger into the axial bore of the shaft body. Thereafter, the rigid retaining ring may be swung downward such that the omega-shaped clasp is in alignment with the axial bore in the shaft body. Subsequently, the spring loaded retractable plunger is released and extends through and beyond the omega-shaped clasp so as to engage the locking pin of the subject invention. Since the omega-shaped clasp portion of the retaining ring is sufficiently rigid, once the plunger is extended therethrough it cannot become disengaged under the influence of external forces such as vibrations or severe shock.

An second embodiment of the locking pin of the subject invention is basically identical to that described in the preferred embodiment but is substantially smaller in size and therefore may be used as a hitch locking pin. In particular, a hitch locking pin is used for detachably connecting farm implements such as mowers, tillers, or cultivators to the drawbar of a tractor.

A third embodiment of the locking pin of the subject invention also includes a shaft body with an enlarged head. However, the third embodiment includes a rigid generally semi-circular retaining member which is pivotally mounted in the shaft head. The generally semi-circular retaining member also includes an omega-shaped clasp portion which is identical in structure and function to that described in the preferred embodiment.

BRIEF DESCRIPTION OF THE DRAWINGS

FIG. 4A is a partial sectional view taken along line 4A—4A in FIG. 2, of the backhoe locking pin of the subject invention in an open position.

FIG. 4B a side elevational view of the backhoe locking pin of the subject invention prior to being locked.

FIG. 4C is a side elevational view of the backhoe locking pin of the sub invention in a locked position.

FIG. 5 is a front elevational view of a second embodiment of the locking pin of the subject invention.

FIG. 6 is a front elevational view of a third embodiment of the backhoe locking pin of the subject invention.

DETAILED DESCRIPTION OF THE PREFERRED EMBODIMENT

Figure 1:
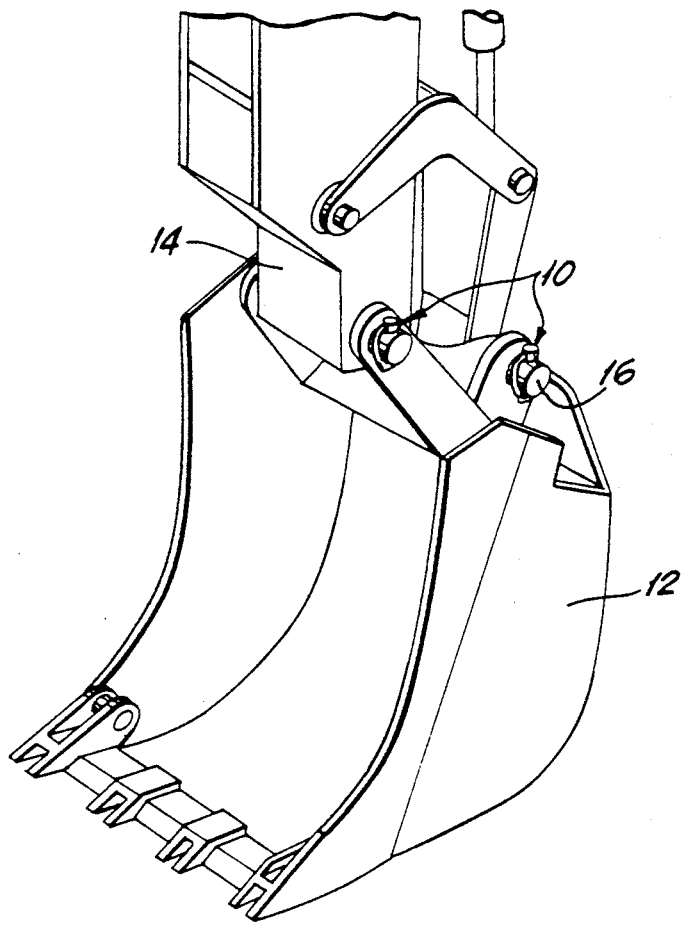
FIG. 1 is a perspective view of the backhoe locking pin of the subject invention employed with a bucket on a backhoe loader.
Figure 2:
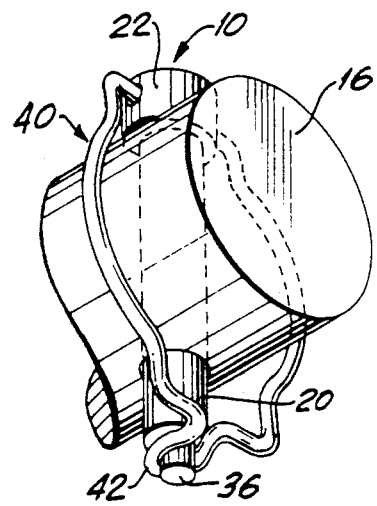
FIG. 2 is a perspective view of the backhoe locking pin of the subject invention.
Figure 3:
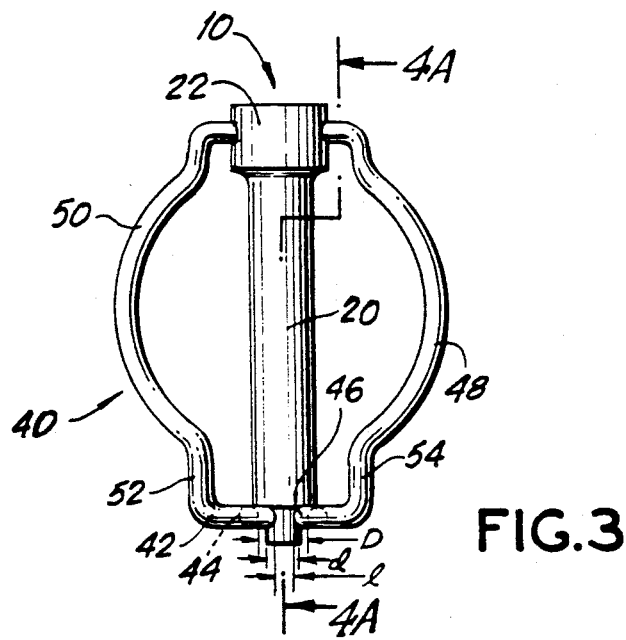
FIG. 3 is a front elevational view of the backhoe locking pin of the subject invention.

Referring to FIG. 1 the backhoe locking pin of the subject invention is designated generally by reference numeral 10. The locking pin 10 is generally employed to detachably connect a bucket 12 to the dipper stick 14 of a backhoe loader. The locking pin 10 is particularly suited for repeated use, and is not susceptible to disengagement by external forces.

Turning to FIGS. 2 through 4A, the details of construction of the backhoe locking pin 10 of the subject invention are illustrated. The backhoe locking pin 10 comprises a cylindrical metal shaft body 20 having an enlarged head portion 22. An elongated cylindrical opening 24 extends through the head 22 of the shaft body 20 and is disposed orthogonal to the axial center line of the locking pin 10. The cylindrical shaft body 20 includes a stepped axial bore 26 which extends partially therethrough from the lower distal end 28 thereof. The stepped axial bore 26 includes an upper portion 30 and a lower portion 32. The diameter of the upper portion 30 of the stepped axial bore 26 is greater than the diameter of the lower portion 32 of the stepped axial bore 26. A coiled spring 34 is disposed in the upper portion 30 of the stepped axial bore 26. The locking pin 10 further includes a retractable plunger 36 having a diameter "d" and which includes an enlarged head 38. The head 38 of the plunger 36 is disposed in the upper portion 30 of the stepped axial bore 26 such that the body of the plunger 36 is slidably mounted in the lower portion 32 of the stepped axial bore 26. When the coiled spring 34 is in a relaxed and fully extended condition the retractable plunger 36 extends beyond the lower distal end 28 of the shaft body 20.

The backhoe locking pin 10 of the subject invention further comprises a rigid retaining ring 40 which is formed from metal. The rigid retaining ring 40 is pivotally mounted in the elongated opening 24 which is provided in the enlarged head 22 of the shaft body 20. The retaining ring 40 includes a generally omega-shaped clasp portion 42 which extends generally orthogonal to the plane of the ring 40 and is operative with the spring loaded plunger 36. The omega-shaped clasp portion 42 has an inner diameter "D" which is greater than the diameter "d" of the retractable plunger 36. Furthermore, the opposed ends 44 and 46 of the omega-shaped clasp portion 42 are separated by a distance "1" which is less than the diameter "d" of the retractable plunger 36. The rigid retaining ring 40 further includes opposed intermediate portions 48 and 50 which have a radius of curvature that is slightly larger than the radius of the mounting shaft 16 which extends outwardly from the dipper stick 14 (see FIG. 2). The rigid retaining ring 40 further includes a mounting portion 52 which extends through the circular aperture 24 provided in the enlarged head 22 of the shaft body 20 and which connects the opposed intermediate portions 48 and 50 at their respective upper ends. Disposed respectively adjacent to the lower ends of the opposed intermediate portions 48 and 50 are extending arms 54 and 56.

Turning now to FIGS. 4B and 4C, the backhoe locking pin of the subject invention is operated by applying an axial force upon the plunger 36 such that the coiled spring 34 is compressed within the upper portion 30 of the stepped axial bore 26. The plunger 36 is urged into the lower portion 32 of the stepped axial bore 26 until such time as it is flush with the distal end 28 of the shaft body 20 as illustrated in FIG. 4B. Thereafter, the rigid retaining ring 40 may be swung downwardly such that the omega-shaped clasp portion 42 is in alignment with the axis of the cylindrical shaft body 20 on the locking pin 10. At such time, the plunger 36 may be released such that the coiled spring 34 forces the plunger 36 to extend through and beyond the omega-shaped clasp portion 42 so as to securely lock the backhoe pin 10. Since the omega-shaped clasp portion 42 is sufficiently rigid, once the retractable plunger 36 is engaged therein it cannot become disengaged under the influence of external force such a vibrations or severe shock.

Turning to FIG. 5, a second embodiment of the locking pin of the subject invention is illustrated and is designated generally by reference numeral 60. The locking pin 60 is substantially identical to the backhoe locking pin 10 in structure and in function. However, the locking pin 60 is smaller than the backhoe locking pin 10 described in the preferred embodiment. Therefore, the locking pin 60 is particularly suited for detachably connecting farm implements such as mowers or tillers to the drawbar of a tractor. The hitch locking pin 60 comprises a shaft body 62 having an enlarged head 63. A spring loaded retractable plunger 64 is disposed within the shaft body 62. The hitch locking pin 60 further includes a generally rectangular retaining member 66 which is pivotally mounted in the head 63 of the shaft body 62. The rectangular retaining member 66 includes a rigid omega-shaped clasp portion 68 (See FIG. 2) which is operative with the retractable plunger 64.

Turning to FIG. 6, a third embodiment of the backhoe locking pin of the subject invention is illustrated and is designated generally by reference numeral 70. The latter embodiment of the backhoe locking pin 70 comprises a cylindrical shaft body 72 having an enlarged head 74. Extended through the head 74 is an elongated cylindrical opening 76 which is disposed orthogonal to the axial centerline of the shaft body 72. The shaft body 72 includes an axial bore 78 which extends partially therethrough. Disposed in the axial bore 78 is coiled spring 80 and a retractable plunger 82 having an axial ridge portion 84. The ridge portion 84 is provided to secure the retractable plunger 82 within the axial bore 78. In order to secure the plunger 82 within the axial bore 78, an indentation 86 must be provided in the shaft body 72 following the initial insertion of the plunger 82 therein during assembly.

The backhoe locking pin 70 further comprises a generally semi-circular rigid retaining member 88 which is pivotally mounted in the cylindrical opening 76 in the head 74 of the shaft body 72. The rigid retaining member 88 includes a mounting portion 90 which extends through the circular aperture 76 and which includes an upturned distal end 92 that functions to prohibit the retaining member 88 from becoming dismounted. The mounting portion 90 further includes a crimp 94 which also prohibits the retaining member 88 from becoming dismounted. The rigid retaining member 84 further includes a curved intermediate portion 96 having a radius of curvature that is particularly dimensioned to partially encompass a desired shaft (See FIG. 2). The rigid retaining member 88 further includes a generally omega-shaped clasp portion 98 which is identical to the clasp portion 42 of the preferred embodiment, and which is operative with the retractable plunger 82.

Referring back to FIGS. 4B and 4C, the third embodiment of the backhoe locking pin 70 of the subject invention is operated by exerting an axial force upon the retractable plunger 82 such that the coiled spring 80 is compressed whereupon the plunger 82 is withdrawn into the axial bore 78. Thereafter, the rigid retaining member 88 may be swung downwardly such that the omega-shaped clasp portion 98 is in alignment with the axial bore 78. At such a time, the retractable plunger 82 may be released, whereby the coiled spring 80 forces the plunger 82 to extend through and beyond the clasp portion 98 so a to securely lock the backhoe pin 70.

In summary, a new and improved backhoe locking pin is provided comprising a cylindrical shaft body having an axial bore wherein a coiled spring and a retractable plunger are disposed. The backhoe locking pin further comprises a pivotally mounted rigid retaining ring member includes a rigid clasp portion that is operative with the spring loaded plunger.

While the invention has been described with respect to a preferred embodiment, it is apparent that various changes may be made without departing from the scope of the invention. For example the retractable plunger described in the third embodiment ma also be incorporated into the preferred embodiment and vis versa.

We claim:

1. A locking pin for detachably connecting excavation implements to a tractor comprising an elongated cylindrical shaft having an enlarged head at one end and having an axial bore extending from the opposed end, said locking pin including a planar retaining member pivotally mounted to said enlarged head, said planar retaining member being longer than the length of said elongated cylindrical shaft, said retaining member having a rigid clasp portion extending generally orthogonal from the plane thereof, said locking pin having retractable plunger means disposed in said axial bore for detachable engagement with said rigid clasp portion, adjacent the distal end of said elongated cylindrical shaft, said rigid clasp portion configured so as to prohibit disengagement of said retractable means therefrom, whereby said retaining member may be pivoted such that the rigid clasp portion is aligned with the retracted plunger means within the axial bore of the shaft, and thereafter the plunger means may be extended through and beyond the rigid clasp portion thereby locking the pin.

2. A locking pin as in claim 1 wherein said retractable plunger means includes a generally cylindrical plunger and a coiled spring for urging said plunger through said rigid clasp portion on said retaining member.

3. A locking pin as in claim wherein said planar portion of said retaining member is generally circular.

4. A locking pin as in claim 1 wherein said planar portion of said retaining member is generally rectangular.

5. A locking pin as in claim wherein said planar portion of said retaining member is generally semi-circular.

6. A locking pin as in claim 2 wherein said rigid clasp portion is generally omega-shaped.

7. A locking pin as in claim 6 wherein said rigid omega-shaped clasp portion has an inner diameter which is greater than the diameter of said cylindrical plunger and the opposed ends of said rigid omega-shaped clasp portion are separated by a distance which is less than the diameter of said cylindrical plunger.

8. A locking pin for detachably connecting excavation implements to a tractor comprising an elongated cylindrical shaft having an enlarged head at one end and having an axial bore extending from the opposed end, said locking pin including a generally circular planar retaining member pivotally mounted to said enlarged head, said generally circular planar retaining member being longer than the length of said elongated cylindrical shaft, said generally circular retaining member having a rigid, generally omega-shaped clasp portion extending generally orthogonal from the plane thereof, said locking pin having a generally cylindrical retractable plunger and a coiled spring disposed in said axial bore, said retractable plunger and said coiled spring being operative for detachable engagement with said rigid omega-shaped clasp portion adjacent the distal end of said elongated cylindrical shaft, whereby said generally circular retaining member may be pivoted such that the rigid omega-shaped clasp portion is aligned with the retracted plunger within the axial bore of the shaft, and thereafter the spring loaded plunger may be extended through and beyond the rigid omega-shaped clasp portion thereby locking the pin.

9. A locking pin as in claim 8 wherein said rigid omega-shaped clasp portion has an inner diameter which is greater than the diameter of said generally cylindrical plunger and the opposed ends of said rigid omega-shaped clasp portion are separated by a distance which is less than the diameter of said generally cylindrical plunger.

10. A locking pin for detachably connecting excavation implements to a tractor comprising an elongated cylindrical shaft having an enlarged head at one end and having an axial bore extending from the opposed end, said locking pin including a generally rectangular planar retaining member pivotally mounted to said enlarged head, said generally rectangular planar retaining member being longer than the length of said elongated cylindrical shaft, said generally rectangular retaining member having a rigid, generally omega-shaped clasp portion extending generally orthogonal from the plane thereof, said locking pin having a generally cylindrical retractable plunger and a coiled spring disposed in said axial bore, said retractable plunger and said coiled spring being operative for detachable engagement with said rigid omega-shaped clasp portion adjacent the distal end of said elongated cylindrical shaft, whereby the generally rectangular retaining member may be pivoted such that the rigid omega-shaped clasp portion is aligned with the retracted plunger means within the axial bore of the shaft, and thereafter the spring loaded plunger may be extended through and beyond the rigid omega-shaped clasp portion thereby locking the pin.

11. A locking pin as in claim 10 wherein said rigid omega-shaped clasp portion has an inner diameter which is greater than the diameter of said cylindrical plunger and the opposed ends of said rigid omega-shaped clasp portion are separated by a distance which is less than the diameter of said cylindrical plunger.

12. A locking pin for detachably connecting excavation implements to a tractor comprising an elongated cylindrical shaft having an enlarged head at one end and having an axial bore extending from the opposed end, said locking pin including a generally semi-circular planar retaining member pivotally mounted to said enlarged head, said generally semi-circular planar retaining member being longer than the length of said elongated cylindrical shaft, said generally semi-circular retaining member having a rigid, generally omega-shaped clasp portion extending generally orthogonal from the plane thereof, said locking pin having a generally cylindrical retractable plunger and a coiled spring disposed in said axial bore, said cylindrical plunger and said coiled spring being operative for detachable engagement with said rigid omega-shaped clasp portion adjacent the distal end of said elongated cylindrical shaft, whereby the generally semi-circular retaining member may be pivoted such that the rigid omega-shaped clasp portion is aligned with the retractable plunger within the axial bore of the shaft, and thereafter the spring loaded plunger may be extended through and beyond the rigid omega-shaped clasp portion thereby locking the pin.

13. A locking pin as in claim 12 wherein said rigid omega-shaped clasp portion has an inner diameter which is greater than the diameter of said generally cylindrical plunger and the opposed ends of said rigid omega-shaped clasp portion are separated by a distance which is less than the diameter of said generally cylindrical plunger.

* * * * *